US012597855B2

(12) United States Patent
Chan

(10) Patent No.: US 12,597,855 B2
(45) Date of Patent: Apr. 7, 2026

(54) POWER SUPPLY DEVICE WITH HIGH OUTPUT STABILITY

(71) Applicant: Acer Incorporated, New Taipei City (TW)

(72) Inventor: Tzu-Tseng Chan, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 177 days.

(21) Appl. No.: 18/734,049

(22) Filed: Jun. 5, 2024

(65) Prior Publication Data

US 2025/0309751 A1 Oct. 2, 2025

(30) Foreign Application Priority Data

Mar. 27, 2024 (TW) .................................. 113111401

(51) Int. Cl.
| | |
|---|---|
| *H02M 3/335* | (2006.01) |
| *H02M 1/00* | (2006.01) |
| *H02M 3/00* | (2006.01) |
| *H02M 3/28* | (2006.01) |
| *H02M 7/219* | (2006.01) |

(52) U.S. Cl.
CPC ........... *H02M 3/01* (2021.05); *H02M 1/0067* (2021.05); *H02M 3/285* (2013.01); *H02M 3/335* (2013.01); *H02M 3/33573* (2021.05); *H02M 3/33576* (2013.01); *H02M 7/219* (2013.01)

(58) Field of Classification Search
CPC ............. H02M 1/4241; H02M 1/0009; H02M 1/0025; H02M 1/0032; H02M 1/0058; H02M 1/007; H02M 1/4225; H02M 3/33569; H02M 7/217; H02M 1/0067; H02M 7/219; H02M 1/0064; H02M 3/285; H02M 3/33573; H02M 3/33576; H02M 3/01
See application file for complete search history.

(56) References Cited

U.S. PATENT DOCUMENTS

| | | | | | |
|---|---|---|---|---|---|
| 4,075,476 | A | * | 2/1978 | Pitel | H05B 41/2855 315/265 |
| 2007/0195566 | A1 | * | 8/2007 | Nielsen | H02M 1/32 363/53 |
| 2010/0026095 | A1 | * | 2/2010 | Phadke | H02M 3/285 307/31 |

(Continued)

*Primary Examiner* — Yusef A Ahmed
(74) *Attorney, Agent, or Firm* — McClure, Qualey & Rodack, LLP

(57) ABSTRACT

A power supply device with high output stability includes a voltage divider circuit, a full bridge rectifier, a resonant capacitor, a first transformer, a second transformer, a first switch element, a second switch element, a third switch element, an output stage circuit, and a detection and control circuit. The first switch element selectively couples the second transformer to the first transformer. The second switch element selectively couples the output stage circuit to the first transformer. The third switch element selectively couples the output stage circuit to the second transformer. The detection and control circuit appropriately controls the first switch element, the second switch element, and the third switch element according to a divided voltage from the voltage divider circuit and a capacitive voltage from the resonant capacitor.

7 Claims, 3 Drawing Sheets

(56) References Cited

U.S. PATENT DOCUMENTS

| | | | |
|---|---|---|---|
| 2011/0222313 A1* | 9/2011 | Ueno | H02M 1/36 |
| | | | 363/15 |
| 2011/0292688 A1* | 12/2011 | Zhang | H02M 1/32 |
| | | | 363/21.02 |
| 2013/0083564 A1* | 4/2013 | Bai | H02M 3/33592 |
| | | | 363/21.02 |
| 2014/0091720 A1* | 4/2014 | Brinlee | H05B 45/375 |
| | | | 315/186 |
| 2016/0149501 A1* | 5/2016 | Dai | H02M 3/07 |
| | | | 363/21.02 |
| 2016/0352231 A1* | 12/2016 | Quigley | H02M 1/36 |
| 2017/0288557 A1* | 10/2017 | Fang | H02M 1/15 |
| 2018/0350513 A1* | 12/2018 | Murakami | H01F 37/00 |
| 2019/0044447 A1* | 2/2019 | Wang | H02M 3/33576 |
| 2019/0267886 A1* | 8/2019 | Hung | H02M 1/08 |
| 2020/0083818 A1* | 3/2020 | Lin | H02M 3/285 |
| 2020/0403507 A1* | 12/2020 | Chan | H02M 1/126 |
| 2021/0184582 A1* | 6/2021 | Chan | H02M 3/33553 |
| 2021/0399643 A1* | 12/2021 | Oh | H02M 1/4258 |
| 2022/0045618 A1* | 2/2022 | Kumar | H02J 7/007 |
| 2022/0173667 A1* | 6/2022 | Chan | H02M 1/088 |
| 2023/0261508 A1* | 8/2023 | Chan | H02M 1/007 |
| | | | 320/166 |
| 2023/0318466 A1* | 10/2023 | Chan | H02M 1/4208 |
| 2024/0079961 A1* | 3/2024 | Chan | H02M 1/0058 |
| 2024/0278659 A1* | 8/2024 | Elezab | B60L 53/62 |
| 2024/0283366 A1* | 8/2024 | Chan | H02M 3/33576 |

* cited by examiner

POWER SUPPLY DEVICE WITH HIGH OUTPUT STABILITY

CROSS REFERENCE TO RELATED APPLICATIONS

This application claims priority of Taiwan Patent Application No. 113111401 filed on Mar. 27, 2024, the entirety of which is incorporated by reference herein.

BACKGROUND OF THE INVENTION

Field of the Invention

The disclosure generally relates to a power supply device, and more specifically, to a power supply device with high output stability.

Description of the Related Art

Power supply devices are indispensable elements in the field of notebook computers. However, if a power supply device has insufficient output stability, it will tend to degrade the overall operational performance of the notebook computer. Accordingly, there is a need to propose novel solution for solving this problem of the prior art.

BRIEF SUMMARY OF THE INVENTION

In an exemplary embodiment, the invention is directed to a power supply device with high output stability. The power supply device includes a voltage divider circuit, a full bridge rectifier, a first transformer, a resonant capacitor, a second transformer, a first switch element, a second switch element, a third switch element, an output stage circuit, and a detection and control circuit. The voltage divider circuit generates a divided voltage according to an input voltage. The full bridge rectifier generates a first rectified voltage and a second rectified voltage according to the input voltage and a driving voltage group. The first transformer includes a first main coil and a first secondary coil. A leakage inductor and a first magnetizing inductor are built in the first transformer. The first main coil receives the first rectified voltage through the leakage inductor. The resonant capacitor provides a capacitive voltage. The second transformer includes a second main coil and a second secondary coil. A second magnetizing inductor is built in the second transformer. The second main coil receives the second rectified voltage through the resonant capacitor. The first switch element selectively couples the second magnetizing inductor to the first magnetizing inductor according to a first control voltage. The output stage circuit generates an output voltage. The second switch element selectively couples the output stage circuit to the first secondary coil according to a second control voltage. The third switch element selectively couples the output stage circuit to the second secondary coil according to a third control voltage. The detection and control circuit generates the driving voltage group, the first control voltage, the second control voltage, and the third control voltage according to the divided voltage and the capacitive voltage.

In some embodiments, the voltage divider circuit includes a first resistor and a second resistor. The first resistor has a first terminal coupled to an input node for receiving the input voltage, and a second terminal coupled to a first node for outputting the divided voltage. The second resistor has a first terminal coupled to the first node, and a second terminal coupled to a ground voltage.

In some embodiments, the driving voltage group includes a first driving voltage, a second driving voltage, a third driving voltage, and a fourth driving voltage. The full bridge rectifier includes a first transistor, a second transistor, a third transistor, and a fourth transistor. The first transistor has a control terminal for receiving the first driving voltage, a first terminal coupled to a second node for outputting the first rectified voltage, and a second terminal coupled to the input node for receiving the input voltage. The second transistor has a control terminal for receiving the second driving voltage, a first terminal coupled to a third node for outputting the second rectified voltage, and a second terminal coupled to the input node. The third transistor has a control terminal for receiving the third driving voltage, a first terminal coupled to the ground voltage, and a second terminal coupled to the second node. The fourth transistor has a control terminal for receiving the fourth driving voltage, a first terminal coupled to the ground voltage, and a second terminal coupled to the third node.

In some embodiments, the leakage inductor has a first terminal coupled to the second node for receiving the first rectified voltage, and a second terminal coupled to a fourth node. The first main coil has a first terminal coupled to the fourth node, and a second terminal coupled to a fifth node. The first magnetizing inductor has a first terminal coupled to the fourth node, and a second terminal coupled to the fifth node. The first secondary coil has a first terminal coupled to a sixth node, and a second terminal coupled to a seventh node.

In some embodiments, the second main coil has a first terminal coupled to an eighth node, and a second terminal coupled to a ninth node. The resonant capacitor has a first terminal coupled to the third node for receiving the second rectified voltage, and a second terminal coupled to the ninth node for outputting the capacitive voltage. The second magnetizing inductor has a first terminal coupled to the eighth node, and a second terminal coupled to the ninth node. The second secondary coil has a first terminal coupled to a tenth node, and a second terminal coupled to an eleventh node.

In some embodiments, the first switch element includes a fifth transistor. The fifth transistor has a control terminal for receiving the first control voltage, a first terminal coupled to the eighth node, and a second terminal coupled to the fifth node. The second switch element includes sixth transistor. The sixth transistor has a control terminal for receiving the second control voltage, a first terminal coupled to a twelfth node, and a second terminal coupled to the sixth node. The third switch element includes a seventh transistor. The seventh transistor has a control terminal for receiving the third control voltage, a first terminal coupled to a thirteenth node, and a second terminal coupled to the tenth node.

In some embodiments, the output stage circuit includes a first diode, a second diode, a third diode, a fourth diode, a fifth diode, a sixth diode, a seventh diode, an eighth diode, and an output capacitor. The first diode has an anode coupled to the twelfth node, and a cathode coupled to an output node for outputting the output voltage. The second diode has an anode coupled to the seventh node, and a cathode coupled to the output node. The third diode has an anode coupled to a common node, and a cathode coupled to the twelfth node. The fourth diode has an anode coupled to the common node, and a cathode coupled to the seventh node. The fifth diode has an anode coupled to the thirteenth node, and a cathode coupled to the output node. The sixth diode has an anode coupled to the eleventh node, and a cathode coupled to the output node. The seventh diode has an anode coupled to the common node, and a cathode coupled to the thirteenth node. The eighth diode has an anode coupled to the common node, and a cathode coupled to the eleventh node. The output capacitor has a first terminal coupled to the output node, and a second terminal coupled to the common node.

In some embodiments, the detection and control circuit includes a first error amplifier and a timer. The first error amplifier has a first input terminal for receiving the divided voltage, a second input terminal for receiving a first reference voltage, and an output terminal for outputting the first control voltage. In response to the first control voltage with a high logic level, the timer starts to count a predetermined time. When the predetermined time has expired, the timer outputs an indication voltage.

In some embodiments, the detection and control circuit further includes an averaging circuit, a second error amplifier, and an AND gate. The averaging circuit calculates an average value of the capacitive voltage, so as to generate an average voltage. The second error amplifier has a first input terminal for receiving the average voltage, a second input terminal for receiving a second reference voltage, and an output terminal for outputting a matching voltage. The AND gate has a first input terminal for receiving the matching voltage, a second input terminal for receiving the indication voltage, and an output terminal for outputting a logic voltage.

In some embodiments, the detection and control circuit further includes an MCU (Microcontroller Unit) for generating the first reference voltage, the second reference voltage, and the driving voltage group. The MCU further generates the second control voltage and the third control voltage according to the logic voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
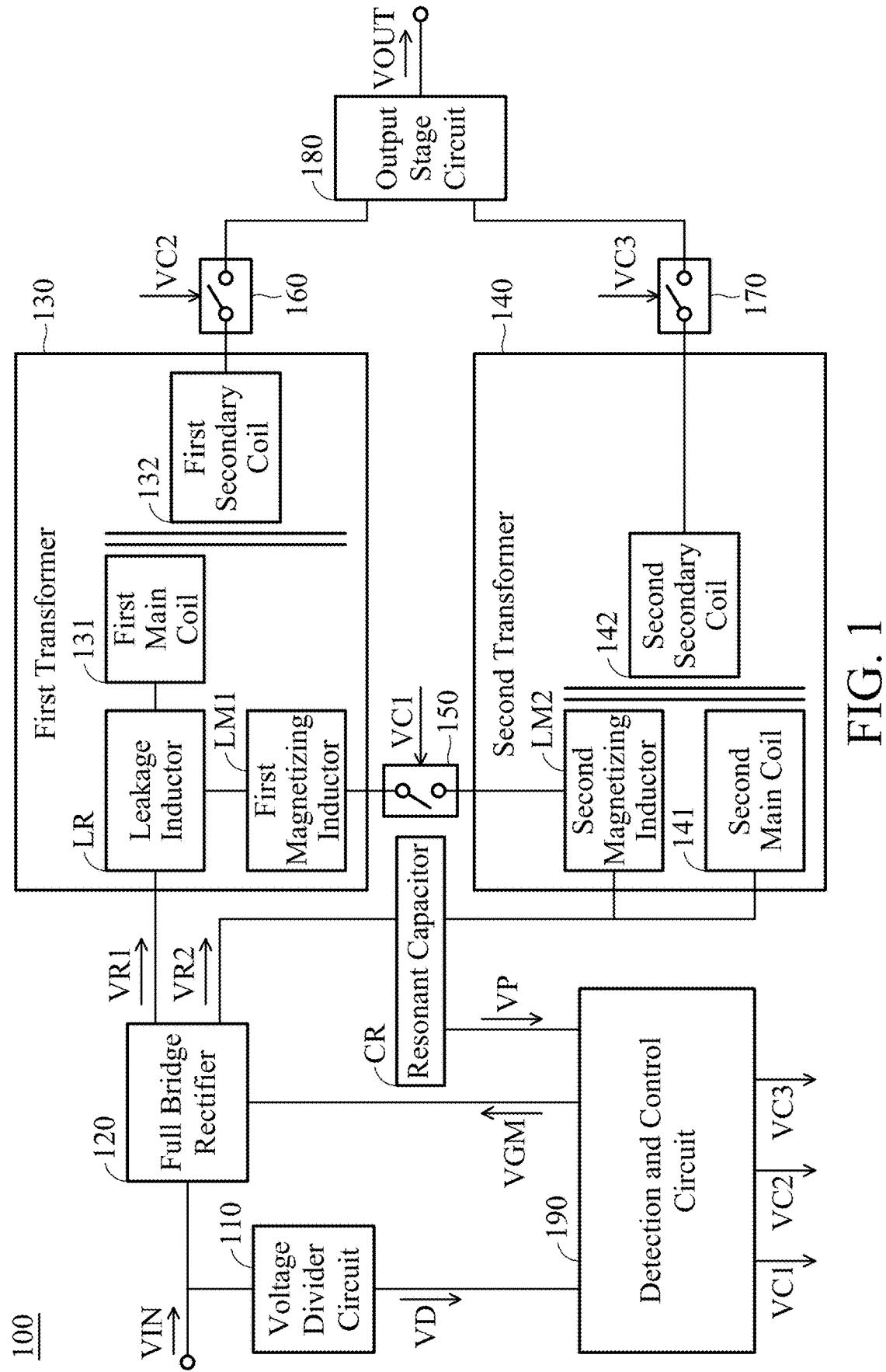
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a voltage divider circuit 110, a full bridge rectifier 120, a resonant capacitor CR, a first transformer 130, a second transformer 140, a first switch element 150, a second switch element 160, a third switch element 170, an output stage circuit 180, and a detection and control circuit 190. It should be noted that the power supply device 100 may further include other components, such as a boost power factor corrector, although they are not displayed in FIG. 1.

The voltage divider circuit 110 generates a divided voltage VD according to an input voltage VIN. For example, the input voltage VIN may be a DC (Direct Current) voltage, whose voltage level may be from 360V to 440V, but it is not limited thereto. The full bridge rectifier 120 generates a first rectified voltage VR1 and a second rectified voltage VR2 according to the input voltage VIN and a driving group VGM. The first transformer 130 includes a first main coil 131 and a first secondary coil 132. A leakage inductor LR and a first magnetizing inductor LM1 are built in the first transformer 130. The leakage inductor LR, the first magnetizing inductor LM1, and the first main coil 131 may be positioned at the same side of the first transformer 130. The first secondary coil 132 may be positioned at the opposite side of the first transformer 130. The first main coil 131 receives the first rectified voltage VR1 through the leakage inductor LR. The first secondary coil 132 can be operated according to the first rectified voltage VR1. The second transformer 140 includes a second main coil 141 and a second secondary coil 142. A second magnetizing inductor LM2 is built in the second transformer 140. The second magnetizing inductor LM2 and the second main coil 141 may be positioned at the same side of the second transformer 140. The second secondary coil 142 may be positioned at the opposite side of the second transformer 140. The second main coil 141 receives the second rectified voltage VR2 through the resonant capacitor CR. The second secondary coil 142 can be operated according to the second rectified voltage VR2. The resonant capacitor CR is coupled to the second magnetizing inductor LM2. The resonant capacitor CR provides a capacitive voltage VP.

The first switch element 150 selectively couples the second magnetizing inductor LM2 to the first magnetizing inductor LM1 according to a first control voltage VC1. For example, if the first control voltage VC1 has a high logic level (i.e., a logic "1"), the first switch element 150 may couple the second magnetizing inductor LM2 to the first magnetizing inductor LM1 (i.e., the first switch element 150 may be similar to a short-circuited path). Conversely, if the first control voltage VC1 has a low logic level (i.e., a logic "0"), the first switch element 150 may decouple the second magnetizing inductor LM2 from the first magnetizing inductor LM1 (i.e., the first switch element 150 may be similar to an open-circuited path). The output stage circuit 180 generates an output voltage VOUT. For example, the output voltage VOUT may be another DC voltage, whose voltage level may be from 18V to 22V, but it is not limited thereto. The second switch element 160 selectively couples the output stage circuit 180 to the first secondary coil 132 according to a second control voltage VC2. For example, if the second control voltage VC2 has a high logic level, the second switch element 160 may couple the output stage circuit 180 to the first secondary coil 132 (i.e., the second switch element 160 may be similar to a short-circuited path). Conversely, if the second control voltage VC2 has a low logic level, the second switch element 160 may decouple the output stage circuit 180 from the first secondary coil 132 (i.e., the second switch element 160 may be similar to an open-circuited path). The third switch element 170 selectively couples the output stage circuit 180 to the second secondary coil 142 according to a third control voltage VC3. For example, if the third control voltage VC3 has a high logic level, the third switch element 170 may couple the output stage circuit 180 to the second secondary coil 142 (i.e., the third switch element 170 may be similar to a short-circuited path). Conversely, if the third control voltage VC3 has a low logic level, the third switch element 170 may decouple the output stage circuit 180 from the second secondary coil 142 (i.e., the third switch element 170 may be similar to an open-circuited path). The detection and control circuit 190 generates the driving voltage group VGM, the first control voltage VC1, the second control voltage VC2, and the third control voltage VC3 according to the divided voltage VD and the capacitive voltage VP. With such a design, since the detection and control circuit 190 stores the input energy into the first magnetizing inductor LM1, the second magnetizing inductor LM2, and the resonant capacitor CR in advance, according to practical measurements, the output stability of the power supply device 100 can be significantly improved.

The following embodiments will introduce the detailed structure and operation of the power supply device 100. It should be understood these figures and descriptions are merely exemplary, rather than limitations of the invention.

Figure 2:
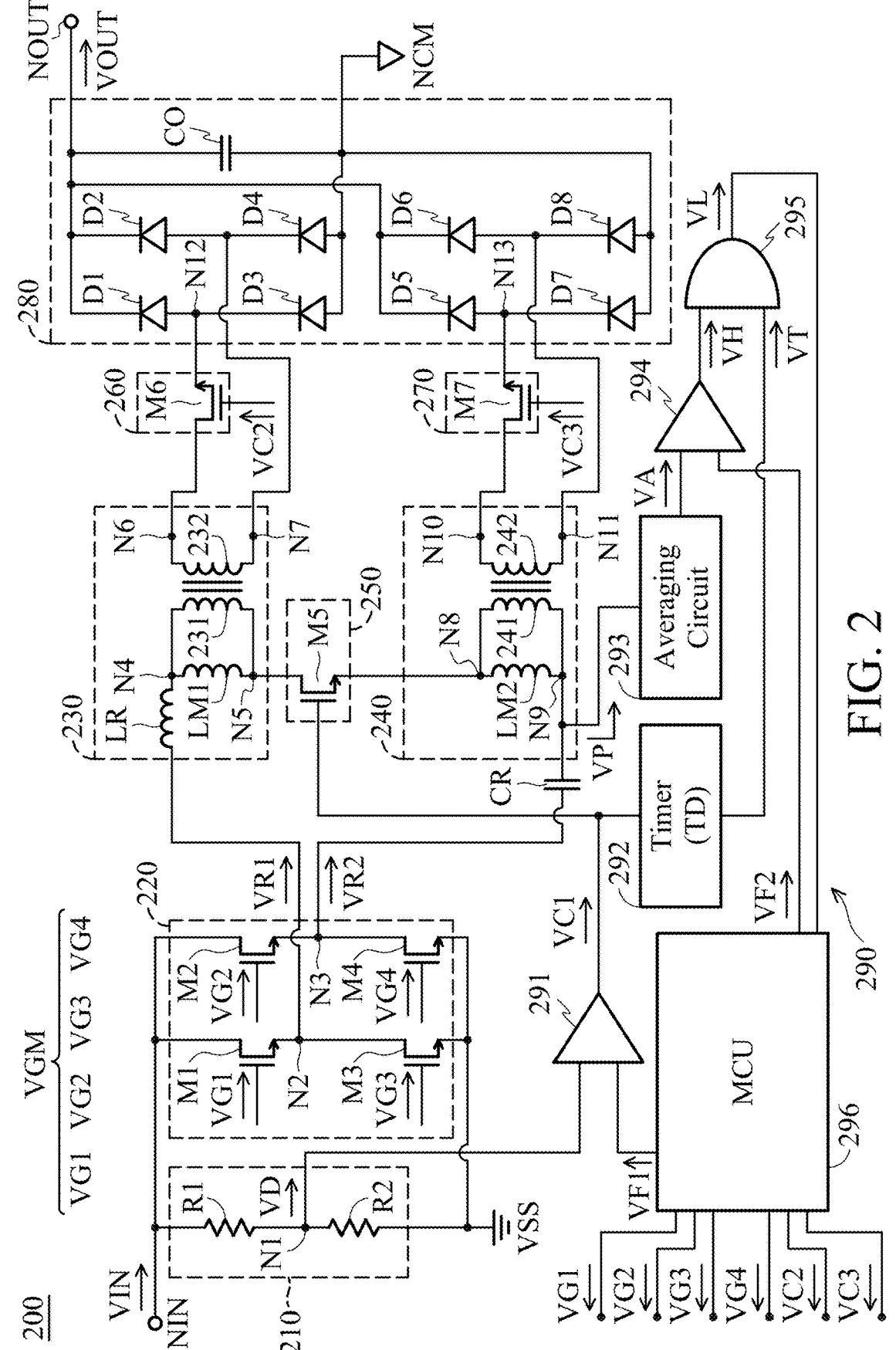
FIG. 2 is a diagram of circuitry of a power supply device according to an embodiment of the invention.

FIG. 2 is a diagram of circuitry of a power supply device 200 according to an embodiment of the invention. In the embodiment of FIG. 2, the power supply device 200 with an input node NIN and an output node NOUT includes a voltage divider circuit 210, a full bridge rectifier 220, a resonant capacitor CR, a first transformer 230, a second transformer 240, a first switch element 250, a second switch element 260, a third switch element 270, an output stage circuit 280, and a detection and control circuit 290. The input node NIN of the power supply device 200 is arranged for receiving an input voltage VIN from a boost converter or an input power source (not shown). The output node NOUT of the power supply device 200 is arranged for outputting an output voltage VOUT to an external device, such as a notebook computer (not shown).

The voltage divider circuit 210 includes a first resistor R1 and a second resistor R2. The first resistor R1 has a first terminal coupled to the input node NIN, and a second terminal coupled to a first node N1 for outputting a divided voltage VD. The second resistor R2 has a first terminal coupled to the first node N1, and a second terminal coupled to a ground voltage VSS (e.g., 0V).

The full bridge rectifier 220 includes a first transistor M1, a second transistor M2, a third transistor M3, and a fourth transistor M4. For example, each of the first transistor M1, the second transistor M2, the third transistor M3, and the fourth transistor M4 may be an NMOSFET (N-type Metal Oxide Semiconductor Field Effect Transistor). The first transistor M1 has a control terminal (e.g., a gate) for receiving a first driving voltage VG1, a first terminal (e.g., a source) coupled to a second node N2 for outputting a first rectified voltage VR1, and a second terminal (e.g., a drain)

coupled to the input node NIN. The second transistor M2 has a control terminal (e.g. a gate) for receiving a second driving voltage VG2, a first terminal (e.g., a source) coupled to a third node N3 for outputting a second rectified voltage VR2, and a second terminal (e.g., a drain) coupled to the input node NIN. The third transistor M3 has a control terminal (e.g., a gate) for receiving a third driving voltage VG3, a first terminal (e.g., a source) coupled to the ground voltage VSS, and a second terminal (e.g., a drain) coupled to the second node N2. The fourth transistor M4 has a control terminal (e.g., a gate) for receiving a fourth driving voltage VG4, a first terminal (e.g., a source) coupled to the ground voltage VSS, and a second terminal (e.g., a drain) coupled to the third node N3.

The first transformer 230 includes a first main coil 231 and a first secondary coil 232. A leakage inductor LR and a first magnetizing inductor LM1 are built in the first transformer 230. The leakage inductor LR and the first magnetizing inductor LM1 are inherent elements, which are generated when the first transformer 230 is manufactured, and they are not external independent elements. The leakage inductor LR, the first main coil 231, and the first magnetizing inductor LM1 may be positioned at the same side (e.g., the primary side) of the first transformer 230. The first secondary coil 232 may be positioned at the opposite side (e.g., the secondary side isolated from the primary side) of the first transformer 230. The leakage inductor LR has a first terminal coupled to the second node N2 for receiving the first rectified voltage VR1, and a second terminal coupled to a fourth node N4. The first main coil 231 has a first terminal coupled to the fourth node N4, and a second terminal coupled to a fifth node N5. The first magnetizing inductor LM1 has a first terminal coupled to the fourth node N4, and a second terminal coupled to the fifth node N5. The first secondary coil 232 has a first terminal coupled to a sixth node N6, and a second terminal coupled to a seventh node N7.

The second transformer 240 includes a second main coil 241 and a second secondary coil 242. A second magnetizing inductor LM2 is built in the second transformer 240. The second magnetizing inductor LM2 is an inherent element, which is generated when the second transformer 240 is manufactured, and it is not an external independent element. The first main coil 241 and the second magnetizing inductor LM2 may be positioned at the same side (e.g., the primary side) of the second transformer 240. The second secondary coil 242 may be positioned at the opposite side (e.g., the secondary side isolated from the primary side) of the second transformer 240. The second main coil 241 has a first terminal coupled to an eighth node N8, and a second terminal coupled to a ninth node N9. The resonant capacitor CR has a first terminal coupled to the third node N3 for receiving the second rectified voltage VR2, and a second terminal coupled to the ninth node N9 for outputting a capacitive voltage VP. The second magnetizing inductor LM2 has a first terminal coupled to the eighth node N8, and a second terminal coupled to the ninth node N9. The second secondary coil 242 has a first terminal coupled to a tenth node N10, and a second terminal coupled to an eleventh node N11.

The first switch element 250 includes a fifth transistor M5. For example, the fifth transistor M5 may be an NMOSFET. The fifth transistor M5 has a control terminal (e.g., a gate) for receiving a first control voltage VC1, a first terminal (e.g., a source) coupled to the eighth node N8, and a second terminal (e.g., a drain) coupled to the fifth node N5.

The second switch element 260 includes a sixth transistor M6. For example, the sixth transistor M6 may be an NMOS-FET. The sixth transistor M6 has a control terminal (e.g., a gate) for receiving a second control voltage VC2, a first terminal (e.g., a source) coupled to a twelfth node N12, and a second terminal (e.g., a drain) coupled to the sixth node N6.

The third switch element 270 includes a seventh transistor M7. For example, the seventh transistor M7 may be an NMOSFET. The seventh transistor M7 has a control terminal (e.g., a gate) for receiving a third control voltage VC3, a first terminal (e.g., a source) coupled to a thirteenth node N13, and a second terminal (e.g., a drain) coupled to the tenth node N10.

The output stage circuit 280 includes a first diode D1, a second diode D2, a third diode D3, a fourth diode D4, a fifth diode D5, a sixth diode D6, a seventh diode D7, an eighth diode D8, and an output capacitor CO. The first diode D1 has an anode coupled to the twelfth node N12, and a cathode coupled to the output node NOUT. The second diode D2 has an anode coupled to the seventh node N7, and a cathode coupled to the output node NOUT. The third diode D3 has an anode coupled to a common node NCM, and a cathode coupled to the twelfth node N12. For example, the common node NCM may provide a common voltage, which may be considered as another ground voltage and may be the same as or different from the aforementioned ground voltage VSS. The fourth diode D4 has an anode coupled to the common node NCM, and a cathode coupled to the seventh node N7. The fifth diode D5 has an anode coupled to the thirteenth node N13, and a cathode coupled to the output node NOUT. The sixth diode D6 has an anode coupled to the eleventh node N11, and a cathode coupled to the output node NOUT. The seventh diode D7 has an anode coupled to the common node NCM, and a cathode coupled to the thirteenth node N13. The eighth diode D8 has an anode coupled to the common node NCM, and a cathode coupled to the eleventh node N11. The output capacitor CO has a first terminal coupled to the output node NOUT, and a second terminal coupled to the common node NCM.

The detection and control circuit 290 includes a first error amplifier 291, a timer 292, an average circuit 293, a second error amplifier 294, an AND gate 295, and an MCU (Microcontroller Unit) 296.

The first error amplifier 291 has a first input terminal for receiving the divided voltage VD, a second input terminal for receiving a first reference voltage VF1, and an output terminal for outputting the first control voltage VC1. For example, if the divided voltage VD is exactly equal to the first reference voltage VF1, the first error amplifier 291 may output the first control voltage VC1 with a high logic level. Conversely, if the divided voltage VD is different from the first reference voltage VF1, the first error amplifier 291 may output the first control voltage VC1 with a low logic level.

The timer 292 monitors the state of the first control voltage VC1. If the first control voltage VC1 is kept at a low logic level, the timer 292 will not take any action. Conversely, in response to the first control voltage VC1 having a high logic level, the timer 292 starts to count a predetermined time TD. Next, when the predetermined time TD has expired, the timer 292 outputs an indication voltage VT with a high logic level. In some embodiments, the predetermined time TD is from 10 ms to 20 ms, such as about 16.67 ms.

The averaging circuit 293 calculates the average value of the capacitive voltage VP, so as to generate an average voltage VA. For example, the average voltage VA may represent the average level of the capacitive voltage VP measured within a predefined time, but it is not limited thereto.

The second error amplifier 294 has a first input terminal for receiving the average voltage VA, a second input terminal for receiving a second reference voltage VF2, and an output terminal for outputting a matching voltage VH. For example, if the average voltage VA is exactly equal to the second reference voltage VF2, the second error amplifier 294 may output the matching voltage VH with a high logic level. Conversely, if the average voltage VA is different from the second reference voltage VF2, the second error amplifier 294 may output the matching voltage VH with a low logic level.

The AND gate 295 has a first input terminal for receiving the matching voltage VH, a second input terminal for receiving the indication voltage VT, and an output terminal for outputting a logic voltage VL. For example, if both the matching voltage VH and the indication voltage VT have high logic levels, the AND gate 295 may output the logic voltage VL with a high logic level. Conversely, if any of the matching voltage VH and the indication voltage VT has a low logic level, the AND gate 295 may output the logic voltage VL with a low logic level.

The MCU 296 generates the first reference voltage VF1, the second reference voltage VF2, and the driving voltage group VGM. In addition, the MCU 296 further generates the second control voltage VC2 and the third control voltage VC3 according to the logic voltage VL. In some embodiments, the driving voltage group VGM includes the first driving voltage VG1, the second driving voltage VG2, the third driving voltage VG3, and the fourth driving voltage VG4 as mentioned above, and all of them are applied to the full bridge rectifier 220.

Figure 3:
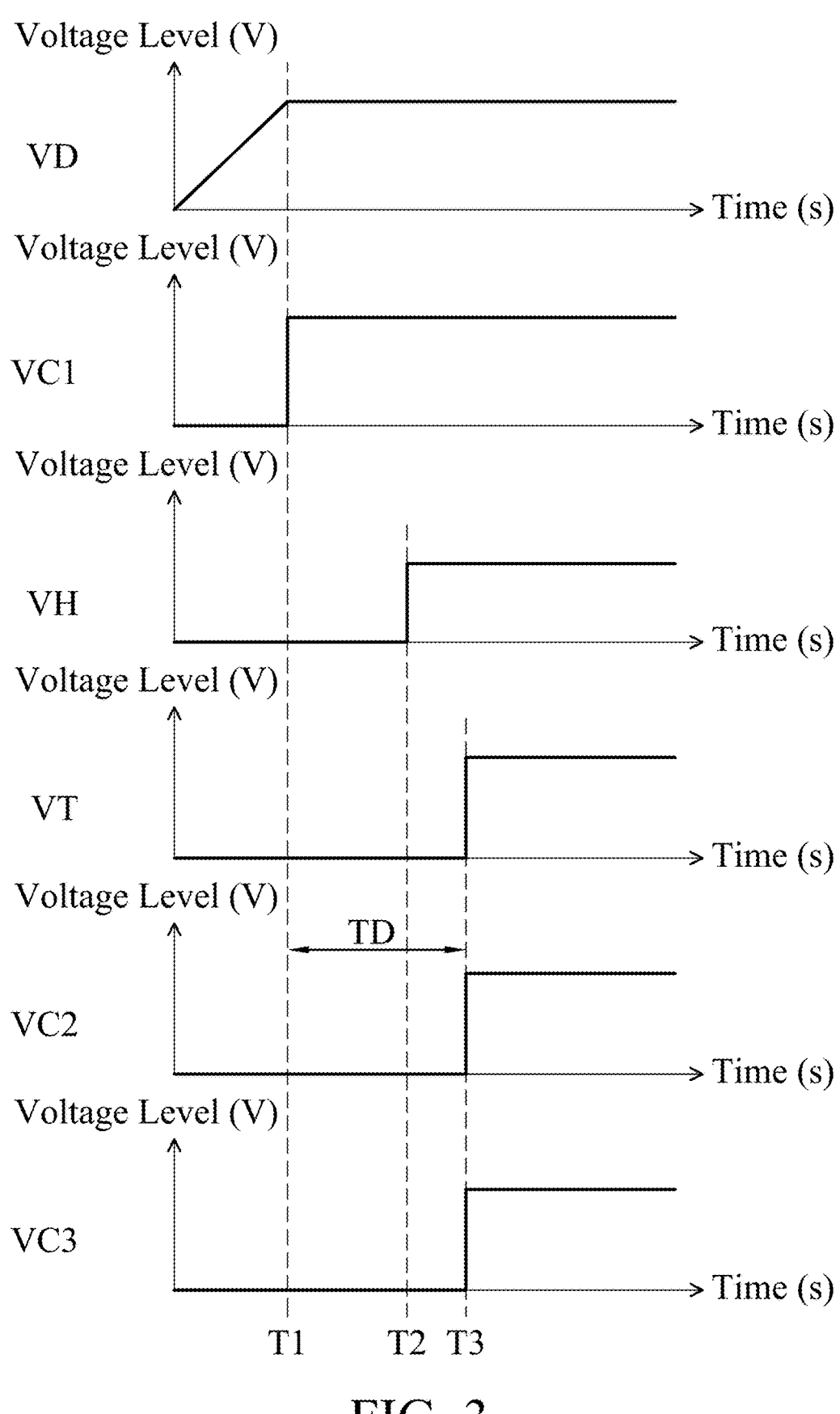
FIG. 3 is a diagram of voltage waveforms of a power supply device according to an embodiment of the invention.

FIG. 3 is a diagram of voltage waveforms of the power supply device 200 according to an embodiment of the invention. The horizontal axis represents time(s), and the vertical axis represents each voltage level (V). Please refer to FIG. 2 and FIG. 3 together to understand the operational principles of the power supply device 200, which will be described in detail as follows.

Initially, the divided voltage VD gradually becomes higher. At a first time point T1, the divided voltage VD is exactly equal to the first reference voltage VF1, such that the first error amplifier 291 outputs the first control voltage VC1 with the high logic level. Under the circumstance, the first switch element 250 is closed, and the input energy is stored into the first magnetizing inductor LM1, the second magnetizing inductor LM2, and the resonant capacitor CR. Also, the timer 292 starts to count the predetermined time TD.

Because the input energy enters the resonant capacitor CR, the capacitive voltage VP and the average voltage VA gradually become higher. At a second time point T2, the average voltage VA is exactly equal to the second reference voltage VF2, such that the second error amplifier 294 outputs the matching voltage VH with a high logic level.

When the predetermined time TD has expired, at a third time point T3, the timer 292 outputs to the indication voltage VT with a high logic level. On the condition, the AND gate 295 also outputs the logic level VL with a high logic level. In response to the aforementioned logic level VL, the MCU 296 switches each of the second control voltage VC2 and the third control voltage VC3 from a low logic level to a high logic level. It should be noted that before the output stage circuit 280 is enabled, a stable resonant tank is formed by the first magnetizing inductor LM1, the second magnetizing inductor LM2, and the resonant capacitor CR. As a result, there may not be a non-ideal oscillation occurring at the output voltage VOUT of the power supply device 200. In other words, the overall output stability of the power supply device 200 can be effectively improved.

After the output stage circuit 280 is enabled, the power supply device 200 can alternatively operate in a first mode and a second mode, but it is not limited thereto. For example, in the first mode, the first transistor M1, the fourth transistor M4, the first diode D1, the fourth diode D4, the fifth diode D5, and the eighth diode D8 may all be enabled. On the other hand, in the second mode, the second transistor M2, the second transistor M3, the second diode D2, the third diode D3, the sixth diode D6, and the seventh diode D7 may all be enabled.

The invention proposes a novel power supply device. According to practical measurements, the power supply device using the aforementioned design can significantly improve the output stability, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-3. The invention may merely include any one or more features of any one or more embodiments of FIGS. 1-3. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device with high output stability, comprising:
   a voltage divider circuit, generating a divided voltage according to an input voltage;
   a full bridge rectifier, generating a first rectified voltage and a second rectified voltage according to the input voltage and a driving voltage group;
   a first transformer, comprising a first main coil and a first secondary coil, wherein a leakage inductor and a first magnetizing inductor are built in the first transformer, and the first main coil receives the first rectified voltage through the leakage inductor;
   a resonant capacitor, providing a capacitive voltage;
   a second transformer, comprising a second main coil and a second secondary coil, wherein a second magnetizing inductor is built in the second transformer, and the second main coil receives the second rectified voltage through the resonant capacitor;
   a first switch element, selectively coupling the second magnetizing inductor to the first magnetizing inductor according to a first control voltage;
   an output stage circuit, generating an output voltage;
   a second switch element, selectively coupling the output stage circuit to the first secondary coil according to a second control voltage;
   a third switch element, selectively coupling the output stage circuit to the second secondary coil according to a third control voltage; and
   a detection and control circuit, generating the driving voltage group, the first control voltage, the second control voltage, and the third control voltage according to the divided voltage and the capacitive voltage;
   wherein the voltage divider circuit comprises:
   a first resistor, wherein the first resistor has a first terminal coupled to an input node for receiving the input voltage, and a second terminal coupled to a first node for outputting the divided voltage; and
   a second resistor, wherein the second resistor has a first terminal coupled to the first node, and a second terminal coupled to a ground voltage;
   wherein the driving voltage group comprises a first driving voltage, a second driving voltage, a third driving voltage, and a fourth driving voltage:
   wherein the full bridge rectifier comprises:
   a first transistor, wherein the first transistor has a control terminal for receiving the first driving voltage, a first terminal coupled to a second node for outputting the first rectified voltage, and a second terminal coupled to the input node for receiving the input voltage;
   a second transistor, wherein the second transistor has a control terminal for receiving the second driving voltage, a first terminal coupled to a third node for outputting the second rectified voltage, and a second terminal coupled to the input node;
   a third transistor, wherein the third transistor has a control terminal for receiving the third driving voltage, a first terminal coupled to the ground voltage, and a second terminal coupled to the second node; and
   a fourth transistor, wherein the fourth transistor has a control terminal for receiving the fourth driving voltage, a first terminal coupled to the ground voltage, and a second terminal coupled to the third node;
   wherein the leakage inductor has a first terminal coupled to the second node for receiving the first rectified voltage, and a second terminal coupled to a fourth node, wherein the first main coil has a first terminal coupled to the fourth node, and a second terminal coupled to a fifth node, wherein the first magnetizing inductor has a first terminal coupled to the fourth node, and a second terminal coupled to the fifth node, and wherein the first secondary coil has a first terminal coupled to a sixth node, and a second terminal coupled to a seventh node;
   wherein the second main coil has a first terminal coupled to an eighth node, and a second terminal coupled to a ninth node, wherein the resonant capacitor has a first terminal coupled to the third node for receiving the second rectified voltage, and a second terminal coupled to the ninth node for outputting the capacitive voltage, wherein the second magnetizing inductor has a first terminal coupled to the eighth node, and a second terminal coupled to the ninth node, and wherein the second secondary coil has a first terminal coupled to a tenth node, and a second terminal coupled to an eleventh node;

wherein the first switch element comprises:

a fifth transistor, wherein the fifth transistor has a control terminal for receiving the first control voltage, a first terminal coupled to the eighth node, and a second terminal coupled to the fifth node;

wherein the second switch element comprises:

a sixth transistor, wherein the sixth transistor has a control terminal for receiving the second control voltage, a first terminal coupled to a twelfth node, and a second terminal coupled to the sixth node; and wherein the third switch element comprises:

a seventh transistor, wherein the seventh transistor has a control terminal for receiving the third control voltage, a first terminal coupled to a thirteenth node, and a second terminal coupled to the tenth node.

2. The power supply device as claimed in claim 1, wherein the output stage circuit comprises:

a first diode, wherein the first diode has an anode coupled to the twelfth node, and a cathode coupled to an output node for outputting the output voltage;

a second diode, wherein the second diode has an anode coupled to the seventh node, and a cathode coupled to the output node;

a third diode, wherein the third diode has an anode coupled to a common node, and a cathode coupled to the twelfth node;

a fourth diode, wherein the fourth diode has an anode coupled to the common node, and a cathode coupled to the seventh node;

a fifth diode, wherein the fifth diode has an anode coupled to the thirteenth node, and a cathode coupled to the output node;

a sixth diode, wherein the sixth diode has an anode coupled to the eleventh node, and a cathode coupled to the output node;

a seventh diode, wherein the seventh diode has an anode coupled to the common node, and a cathode coupled to the thirteenth node;

an eighth diode, wherein the eighth diode has an anode coupled to the common node, and a cathode coupled to the eleventh node; and an output capacitor, wherein the output capacitor has a first terminal coupled to the output node, and a second terminal coupled to the common node.

3. The power supply device as claimed in claim 1, wherein the detection and control circuit comprises:

a first error amplifier, wherein the first error amplifier has a first input terminal for receiving the divided voltage, a second input terminal for receiving a first reference voltage, and an output terminal for outputting the first control voltage.

4. The power supply device as claimed in claim 3, wherein the detection and control circuit further comprises:

a timer, wherein in response to the first control voltage with a high logic level, the timer starts to count a predetermined time, and when the predetermined time has expired, the timer outputs an indication voltage.

5. The power supply device as claimed in claim 4, wherein the detection and control circuit further comprises:

an averaging circuit, calculating an average value of the capacitive voltage, so as to generate an average voltage; and a second error amplifier, wherein the second error amplifier has a first input terminal for receiving the average voltage, a second input terminal for receiving a second reference voltage, and an output terminal for outputting a matching voltage.

6. The power supply device as claimed in claim 5, wherein the detection and control circuit further comprises:

an AND gate, wherein the AND gate has a first input terminal for receiving the matching voltage, a second input terminal for receiving the indication voltage, and an output terminal for outputting a logic voltage.

7. A power supply device with high output stability, comprising:

a voltage divider circuit, generating a divided voltage according to an input voltage;

a full bridge rectifier, generating a first rectified voltage and a second rectified voltage according to the input voltage and a driving voltage group;

a first transformer, comprising a first main coil and a first secondary coil, wherein a leakage inductor and a first magnetizing inductor are built in the first transformer, and the first main coil receives the first rectified voltage through the leakage inductor;

a resonant capacitor, providing a capacitive voltage;

a second transformer, comprising a second main coil and a second secondary coil, wherein a second magnetizing inductor is built in the second transformer, and the second main coil receives the second rectified voltage through the resonant capacitor;

a first switch element, selectively coupling the second magnetizing inductor to the first magnetizing inductor according to a first control voltage;

an output stage circuit, generating an output voltage;

a second switch element, selectively coupling the output stage circuit to the first secondary coil according to a second control voltage;

a third switch element, selectively coupling the output stage circuit to the second secondary coil according to a third control voltage; and a detection and control circuit, generating the driving voltage group, the first control voltage, the second control voltage, and the third control voltage according to the divided voltage and the capacitive voltage;

wherein the detection and control circuit comprises:

a first error amplifier, wherein the first error amplifier has a first input terminal for receiving the divided voltage, a second input terminal for receiving a first reference voltage, and an output terminal for outputting the first control voltage;

a timer, wherein in response to the first control voltage with a high logic level, the timer starts to count a predetermined time, and when the predetermined time has expired, the timer outputs an indication voltage;

an averaging circuit, calculating an average value of the capacitive voltage, so as to generate an average voltage;

a second error amplifier, wherein the second error amplifier has a first input terminal for receiving the average voltage, a second input terminal for receiving a second reference voltage, and an output terminal for outputting a matching voltage;

an AND gate, wherein the AND gate has a first input terminal for receiving the matching voltage, a second input terminal for receiving the indication voltage, and an output terminal for outputting a logic voltage; and an MCU (Microcontroller Unit), generating the first reference voltage, the second reference voltage, and the driving voltage group, wherein the MCU further generates the second control voltage and the third control voltage according to the logic voltage.

\* \* \* \* \*